United States Patent [19]
Elvegaard

[11] 3,921,263
[45] Nov. 25, 1975

[54] FASTENING DEVICE FOR TUBES AND THE LIKE

[76] Inventor: Eilif Elvegaard, Karstensensvei 30, 1660 Lisleby, Norway

[22] Filed: Apr. 11, 1974

[21] Appl. No.: 459,932

[30] Foreign Application Priority Data
Apr. 13, 1973 Norway.............................. 1562/73

[52] U.S. Cl...................................... 24/263; 24/16
[51] Int. Cl.² ......................................... A44B 21/00
[58] Field of Search .......... 24/268, 263 HW, 16 PB, 24/17 PB, 263

[56] References Cited
UNITED STATES PATENTS

| | | | |
|---|---|---|---|
| 918,407 | 4/1909 | Wiest..................................... | 24/268 |
| 1,026,211 | 5/1912 | Kissinger........................ | 24/268 UX |
| 1,727,038 | 9/1929 | Rousey................................ | 24/268 |

*Primary Examiner*—Paul R. Gilliam
*Assistant Examiner*—Doris L. Troutman
*Attorney, Agent, or Firm*—Stevens, Davis, Miller & Mosher

[57] ABSTRACT

Disclosed is a device for fastening of tubes, conduits and the like, comprising a holder element and a clamp element with a resiliently yieldable intermediate portion between a tube contacting part and a fixing part which is adapted to be clamped by wedge action to a corresponding fixing part on the holder element. The holder element is a rigid plate which is provided with an outwards open cut-out with an essentially V-formed tube contacting part and at least one essentially opposite fixing part, and variable clamping of the clamp element between a tube placed in the cut-out and a fixing part on the holder element is achieved by relative movement between a fixing part on one element and a wedge-surface-forming guiding edge on the other element. In each case the appropriate fixing part on said one element is suitably selected for the actual tube dimension, as said one element is normally provided with a number of fixing parts. The wedge-forming guiding edge on the respective element is provided with barb means for securing of the clamp element in desired position.

4 Claims, 8 Drawing Figures

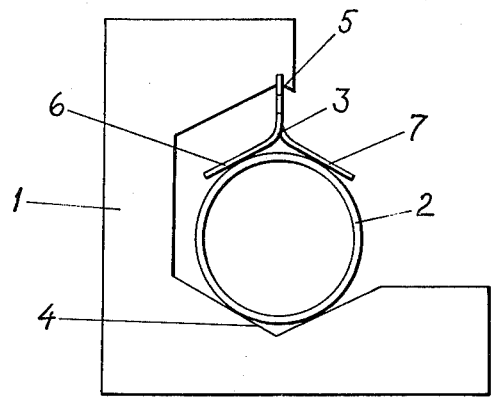
FIG.1
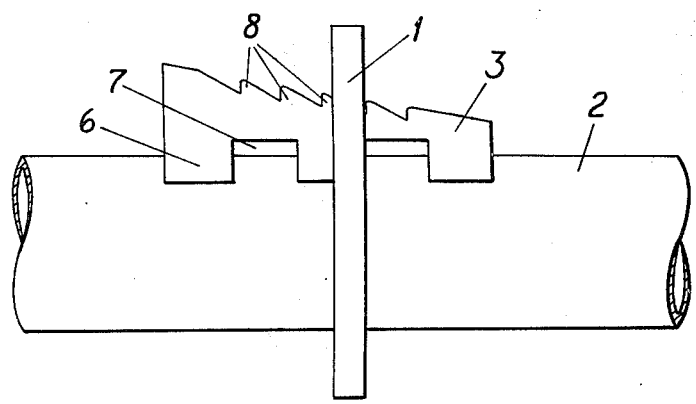
FIG.2
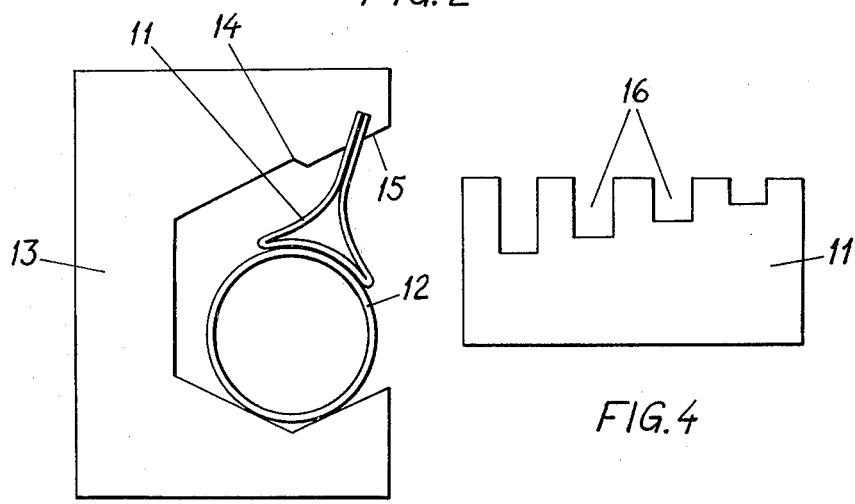
FIG.3
FIG.4

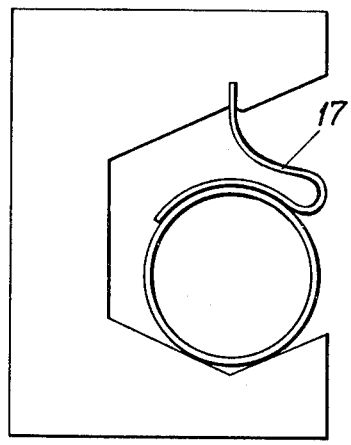
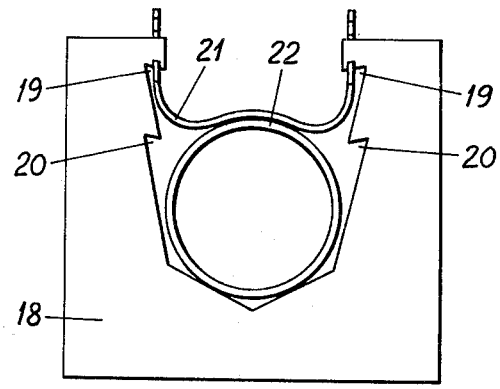
FIG.5  FIG.6
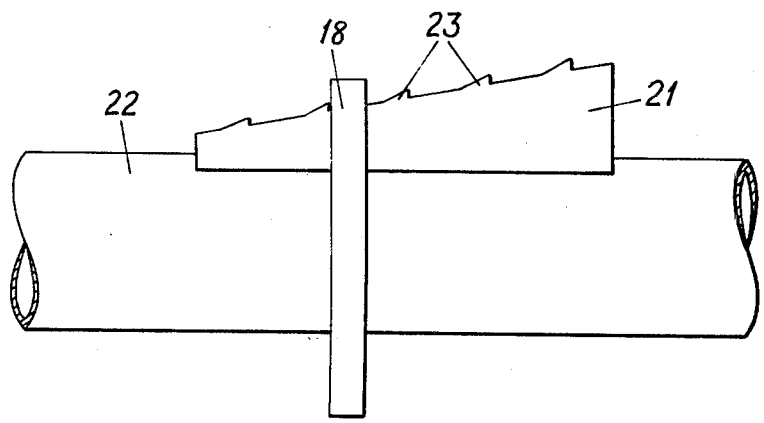
FIG.7
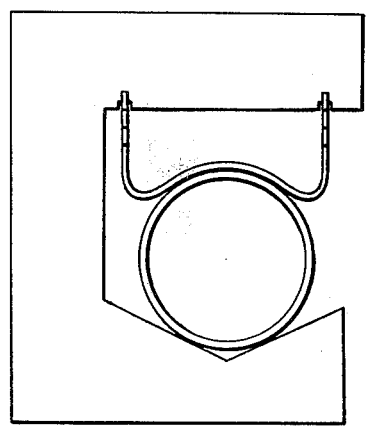
FIG.8

FASTENING DEVICE FOR TUBES AND THE LIKE

This invention relates to a device for fastening of tubes, conduits and the like, comprising a holder element and a clamp element with a resiliently yieldable intermediate portion between a tube contacting part and a fixing part which is adapted to be clamped by wedge action to a corresponding fixing part on the holder element.

The object of the invention is to provide a complete device for fastening of tubes, conduits and the like whereby the same device may be used for several tube dimensions, and the mounting is simple and requires little preparatory work.

A further object of the inveniton is to provide a fastening device wherein both the holder element and the clamp element is of simple construction and may be manufactured in a correspondingly rational and economical way.

These objects are achieved, in accordance with the invention, by a fastening device of the type set forth above, wherein the holder element is a rigid plate provided with an outwards open cut-out with an essentially V-formed tube contacting part and at least one essentially opposite fixing part, variable clamping of the clamp element between a tube placed in the cut-out and a fixing part on the holder element being achieved by relative movement between a fixing part on one element, the fixing part being suitably selected for the actual tube dimension, and a wedge-surface-forming guiding edge on the other element, the guiding edge being provided with barb means for securing of the clamp element in desired position.

The above and other objects, features and advantages of the present invention will become more readily apparant from the following detailed description, reference being made to the appended drawings in which:

FIGS. 1 and 2 show an embodiment of the fastening device wherein a tube is clamped by means of a plate-shaped holder element and a resilient wedge element according to the invention, FIG. 3 shows another embodiment of a fastening device according to the invention wherein the holder element is provided with wedge-surface-forming guiding edge, FIG. 4 shows a side-view of the clamp element in FIG. 3, FIG. 5 shows a similar embodiment of the fastening device as shown in FIG. 3, but with an alternative clamp element, FIG. 6 shows an embodiment wherein the holder element consists of a plate provided with several in pairs connected fixing parts for engagement with a channel-formed wedge element, FIG. 7 shows a side-view of the fastening device in FIG. 6, and FIG. 8 shows an embodiment representing a combination of the embodiment in FIGS. 1 and 6.

In the embodiment of the fastening device shown in FIGS. 1 and 2, the holder element thereof consists of a plate 1 with an outwards open cut-out which accommodates a tube 2 which is to be clamped or fastened. The tube is clamped by means of a clamp element 3. In this example the inner, tube-accommodating part of the cut-out 1 is provided with a V-formed tube contacting part 4 for the tube and with an opposite fixing part 5 for engagement with the clamp element 3. As a result of the fact that the cut-out has a V-formed tube contacting part 4 and further an opposite, inversely V-formed fixing part 5, the contacting parts will give stable support for tubes or the like with varying dimensions, so that tubes of different dimensions may be clamped in a stable way by variable fixing or mounting of the clamp element 3.

As shown in FIG. 2, the clamp element 3 is in the embodiment shown essentially key or wedgeformed and adapted to be mounted or moved in place in the longitudinal direction of the tube. The clamp element is formed of a strip of a suitable, resilient material and is provided with tabs or flaps 6 and 7 which are bent alternately to each side in order to be in contact with the surface of the tube 2 which is to be fastened. The upper part of the clamp element is formed with a wedge surface which is provided with bars or hooks 8 for engagement with the fixing parts 5 of the holder element. Because of the resilient intermediate portions between the flaps and the wedge part of the clamp element the tube contacting surfaces of the flaps will conform to the actual tube periphery by the fastening of the element and provide for stable securing of the tube. When the clamp element with its wedge surface is brought into engagement with the fixing part of the holder element, increased elastic clamping action is achieved between said fixing part and the surface of the tube. The wedge may e.g. be driven in place by means of a hammer or the like.

By fastening of tubes or the like by means of the device of the invention, the holder elements are fixed to the support or substructure with suitable spacings or intervals along the tube which is to be fastened. It will be understood that the used plate may be fixed to the substructure with any side edge of the plate. Thus, the plate may be attached to ceiling, floor or wall, depending upon what is most suitable in the actual case. The holder element may be attached to the substructure by means of welding, but one or more sides of the plate may also be provided with flanges with holes for screw-mounting. The plates may also be provided with holes for hanging or suspended installation. Further, the holder elements may be fixed to the substructure after that the fastening devices have been assembled on the actual tube.

Clamp elements of the same type as shown in FIGS. 1–2 may be formed in various ways by means of suitable plate members. A plate member may e.g. be bent double with the double part formed as a wedge portion of a type corresponding to FIG. 2, and with the end portions of the plate member curved or flared outwards from the double portion in order to form tube contacting surfaces. As an alternative the clamp element may be formed from a plate provided with a concave or arcuate tube contacting surface and which is folded at the outer edges of the tube contacting surface with the end portions brought together and contacting each other at the wedge portion of the clamp element.

In FIG. 3 is shown another embodiment of a fastening device according to the invention, wherein a clamp element 11 is adapted to be brought into engagement between a tube 12 and a fixing part 14 of the holder element 13 in that the holder element is provided with a wedge-surface-forming guiding edge 15 along which the clamp element may be moved in place in a direction transversely to the longitudinal axis of the tube 12. Also in this case the clamp element 11 has a resilient intermediate portion between the tube contacting surface and its clamping part. The clamp element may be formed of a single plate or sheet. In this case however the element does not have any wedge surface but one or more fixing parts in the form of notches in the upper part of the clamp element. In FIG. 4 there is shown an embodiment of such a clamp element viewed from the side. In the embodiment shown the upper part of the element is provided with a number of notches 16 with variable depth and with a width corresponding to the width of the holder plate 13. The clamp element is forced in thereby that the contacting surface of the corresponding notch is placed moved along the guiding edge 15 of the holder plate. As a result of the fact that the clamp element is provided with notches 16 with different depth, one achieves accommodation to different dimensions of the tubes or the like which are to be fastened to the holder element. Instead of a clamp element with several notches as shown in FIG. 4, the element may be provided with a single notch and be correspondingly narrow. This is advantageous if the fastened tube is surrounded by insulation material, as it is then only necessary to remove the insulation in a small area for assembly or disassembly of the clamp element on the tube.

In FIG. 5 there is shown an embodiment of the fastening device wherein the holder element is shown to be of the same construction as in FIG. 3, but wherein the clamp element is different. In this example the clamp element 17 only consists of a plate or sheet strip which is bent to U-form, whereby the curved or bent portion constitutes a resilient intermediate portion between the tube contacting surface and the fixing part of the clamp element. Viewed from the side this clamp element may have the same appearance as the element of FIG. 4, or it may be narrower and provided with only one clamping notch. Alternatively the clamp element 17 may have wedge form and be adapted for clamping in the longitudinal direction of the tube. In this case the holder element may be provided with several fixing parts for adaption to different tube dimensions.

As previously mentioned, the fastening device according to the invention is suitable for clamping of tubes with different dimensions. In FIGS. 6 and 7 there is shown an embodiment according to the invention which is especially adapted for this purpose. In this embodiment the holder element comprises a plate 18 with a cut-out having an essentially U-formed outline wherein the opposite side edges extending at each side of the tube contacting part of the holder element, are provided with opposite notches 19, 20, respectively constituting pairs of fixing parts belonging together. The clamp element here consists of a channel-formed plate or sheet 21 with U-formed cross-section wherein the web-portion of the sheet is adapted for resiliently yielding contact against the tube 22, and the upper edges of the flange portions of the sheet are formed as wedge-surface-forming guiding edges for engagement with associated fixing parts 19 or 20 of the holder element 18. The wedge forming guiding edges are provided with a number of barbs 23 for suitable engagement with fixing parts of the holder element.

In addition to the alternative embodiments which are described above in connection with FIGS. 3–5, advantageous embodiments may also consist of further combinations of the embodiments according to FIGS. 1–8. Such an embodiment respresenting a combination of the embodiments in FIGS. 1 and 6 is shown in FIG. 8.

It is obvious that details of the construction of the fastening devices described above may be varied in many different ways. A holder plate may for example be provided with two or more punchings or cut-outs, for placing and fastening of a corresponding number of tubes or the like next to each other. If a wedge-formed clamp element is used, this may then be designed in such a way that is is capable of securing a pair of tubes. If required the contacting surface between tube and holder plate may be increased by making contacting or abutment flanges on the holder plate, the cut-out then being made in such a way that such flanges may be formed. If necessary, a corresponding or another appropriate method may be used for increasing the contacting surface between the holder plate and the clamp element at the fixing parts.

Instead of being made of a solid plate, the holder plate may also be made of a thinner plate or sheet as it may e.g. be laid double or possibly be broken, so that it gets sufficient strength. The fastening device may be manufactured of metallic material, but it is also suitable for being made of plastic or possibly other material.

I claim:

1. A device for fastening of tubes, conduits and the like, comprising a holder element and a clamp element with a resiliently yieldable intermediate portion between a tube contacting part and a fixing part which is adapted to be clamped by wedge action to a corresponding fixing part on the holder element, wherein the holder element is a rigid plate provided with an outwards open cut-out with an essentially V-formed tube contacting part and at least one esentially opposite fixing part, variable clamping of the clamp element between a tube placed in the cut-out and a fixing part on the holder element being achieved by relative movement between a fixing part on one element, the fixing part being suitably selected for the actual tube dimension, and a wedge-surface-forming guiding edge on the other element, the guiding edge being provided with barb means for securing of the clamp element in desired position.

2. Device according to claim 1, wherein the clamp element is formed of an elastic sheet which is bent to U-form, whereby the outer surface of one leg constitutes a tube contacting surface and the end edge of the other leg is formed as a wedge-surface-forming guiding edge for engagement with a suitable fixing part on the holder element, fastening of a tube being achieved by movement of the clamp element in the longitudinal direction of the tube.

3. Device according to claim 1, wherein the clamp element is formed of an elastic sheet which is bent to U-form, whereby the outer surface of one leg constitutes a tube contacting surface and the end edge of the other leg is provided with at least one fixing part for engagement with a wedge-surface-forming guiding edge arranged on the holder element, fastening of a tube being achieved by movement of the fixing part of the clamp element along said guiding edge transversely to the longitudinal direction of the tube.

4. Device according to claim 1, wherein the cut-out of the holder element on each side of the tube contacting surface comprises opposite side edges provided with at least on pair of fixing parts belonging together, the clamp element being a channel-formed sheet with a web member forming a tube contacting surface and with the upper edges of the flange members being formed as wedge-surface-forming guiding edges for engagement with respective fixing parts on the holder element.

* * * * *